Feb. 28, 1928.
A. J. MURRAY
1,660,719
NONRETURN LINK FOR ANIMAL TRAPS
Filed May 26, 1927
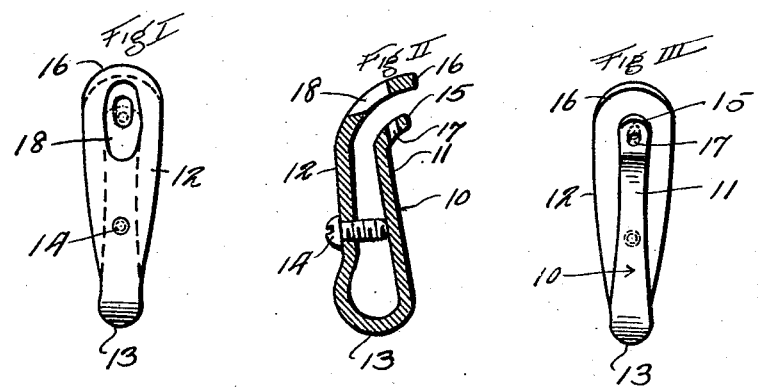
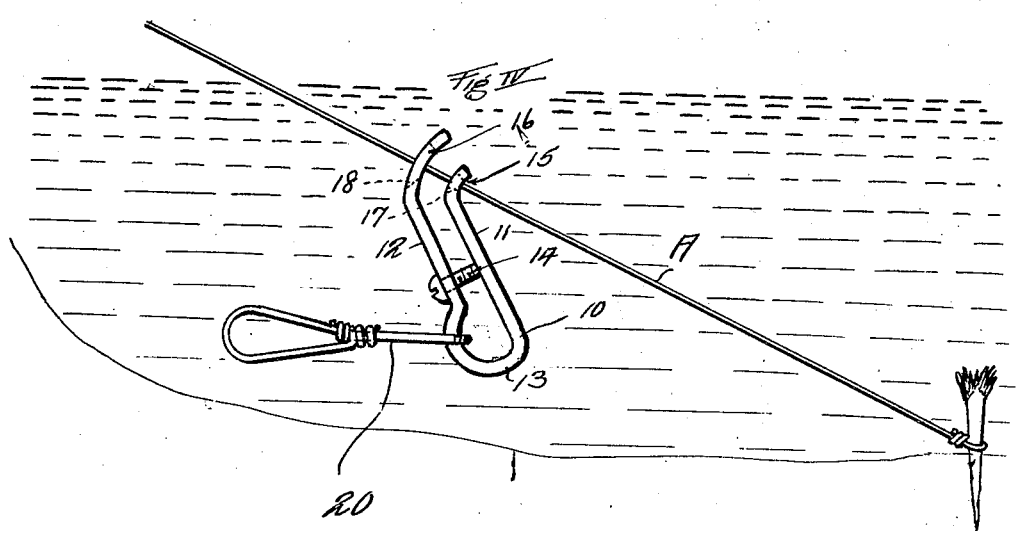
Inventor
A. J. Murray
Watson E. Coleman
Attorney Patented Feb. 28, 1928.

1,660,719

UNITED STATES PATENT OFFICE.

AUGUST J. MURRAY, OF SPALDING, MICHIGAN.

NONRETURN LINK FOR ANIMAL TRAPS.

Application filed May 26, 1927. Serial No. 194,421.

This invention relates to devices for holding animal traps upon trap wires so as to permit the animal, after being trapped, to seek deep water and prevent the animal from returning into shallow water or to land, thus drowning the animal.

The general object of the present invention is to provide a very simple, cheaply made, and effective device of this character which may be easily threaded upon the trap wire and engaged with or disengaged from a trap, and which will only move in one direction on the trap wire so that after the animal reaches deep water with the trap, he can not return again to shallow water or to the land.

My invention is illustrated in the accompanying drawing, wherein:—

Figure 1 is a face view of the sliding wire clamping member;

Figure 2 is a vertical sectional view thereof;

Figure 3 is a rear elevation thereof;

Figure 4 is a view showing the device in applied position;

Referring to the drawing, it will be seen that the trap holding device comprises a strip of metal bent to form an approximately U-shaped body 10 to thus provide the leg 11, the leg 12, and the bight portion 13 which joins the leg 12 by an enlarged circular portion.

Extending through the leg 12 is a screw 14 which bears against the leg 11. The leg 11 at its upper end is angularly bent, as at 15, in a slight curve and the upper end of the leg 12 is also angularly bent in a curve, as at 16, which is approximately concentric to the portion 15. The angular portion 15 is provided with an aperture 17 whose axis is parallel to the face of the leg 11, while the portion 16 is provided with an elongated slot 18 which has one end wall extending parallel to the plane of the leg 11 and the other end wall extending at right angles to the plane of the leg 11.

In the use of this device, the trap holder is disposed upon the wire A, with the wire threaded through the apertures 17 and 18 in the manner shown in Figure 4, and the trap is connected to the bight end of the holder by means of a link 20 of any suitable character and which is engaged with a trap in any suitable manner. The screw 14 acts to prevent this link 20 from riding upward on the holder into proximity to the wire so that any pull upon the trap will exert a leverage on this holder to cause it to turn toward a position where the legs of the holder are at right angles to the wire. Assuming that the wire is fastened at one end to the shore and at the other end to the bed of the stream, then when the animal, such as a muskrat or beaver, gets caught in the trap he will plunge into the body of water with the trap and will drag the trap into the deepest portion of the water in an affort to escape. The holder will move readily down the wire A, inasmuch as any pull upon the outer end of the holder will tend to cause the axis of the aperture 17 to be coincident with the wire A, but any reverse pull upon the holder 10 will cause it to turn or attempt to turn into a position at right angles to the direction of the wire, and under these circumstances the wall of the aperture 17 will bind upon the wire at opposite corners, which corners are relatively sharp, and thus the greater the pull, the greater will be the binding action of this holder upon the wire and the greater the inability of the animal to drag the trap and the holder toward the shore.

It will be seen that this link or holder 1 is very simple, may be readily carried in the pocket, and readily attached to the traps, and that the screw 14 prevents the link 20 which is engaged with the trap from falling out from between the legs 11 and 12. The wire is, of course, anchored to the bottom of the stream by a stone, a sack of sand, or a pole, and the link is then strung on the wire with the small aperture 17 toward the anchor. The advantages of this link or holder as compared with other devices of this character known to me are that it is not a part of the trap but is an accessory that can be removed or connected to the trap at will and very quickly. Not being a part of the trap, it can be set so that the chain lead connected to the trap can be made long or short as desired by moving the link to the desired position. It can either be carried attached to the traps or detached therefrom and the traps can not possibly become unfastened from the link without unstringing the wire.

I claim:—

1. A trap link comprising a strip of metal bent upon itself to provide two legs, each having an aperture therethrough adapted to receive a trap wire, the aperture in one leg being elongated in the direction of the length of the leg and the aperture in the other leg approximately fitting the wire.

2. A trap link comprising a strip of metal bent upon itself to provide two legs, each leg having an aperture therethrough adapted to receive a trap wire, the aperture in one leg behind elongated and the aperture in the other leg approximately fitting the wire, and a screw extending through one of the legs and bearing against the other leg whereby to hold a trap chain operatively engaged therewith.

3. A trap link comprising a strip of metal bent upon itself to provide two legs, each leg being angularly bent at its ends, the angular end of one of the legs having a relatively small aperture therethrough, the axis of which is approximately parallel to the length of the leg, the angular portion of the other leg having a slot, both apertures being adapted to receive a trap wire threaded therethrough and the link being adapted to be connected to a trap.

4. A trap link comprising a strip of metal bent upon itself to provide two legs and a bight portion, each leg having an angular bend at its extremity, the angularly bent portion of one leg being shorter than the angularly bent portion of the other leg and having an aperture therethrough practically parallel to the leg, the other leg having an elongated aperture therethrough, the apertures being adapted to receive a trap wire, and a screw passing through the longer leg and bearing against the inner face of the short leg whereby to lock a chain link in place at the bight end of the trap link.

In testimony whereof I hereunto affix my signature.

AUGUST J. MURRAY.